(12) United States Patent
Amherd

(10) Patent No.: US 6,848,749 B2
(45) Date of Patent: Feb. 1, 2005

(54) DEVICE FOR THE REMOVAL OF THE SURFACE LAYER OF A WALL OR CEILING

(75) Inventor: René Amherd, Reutlingen (CH)

(73) Assignee: Sina Industrieservice GmbH & Co. KG, Pforzheim (DE)

( * ) Notice: Subject to any disclaimer, the term of this patent is extended or adjusted under 35 U.S.C. 154(b) by 0 days.

(21) Appl. No.: 10/072,190

(22) Filed: Feb. 7, 2002

(65) Prior Publication Data

US 2002/0149255 A1 Oct. 17, 2002

(30) Foreign Application Priority Data

Feb. 9, 2001 (CH) .............................................. 0239/01

(51) Int. Cl.⁷ .............................................. B25D 17/18
(52) U.S. Cl. ........................ 299/69; 29/81.15; 173/50; 173/198
(58) Field of Search ........................ 299/18, 37.3, 37.4, 299/37.5, 69, 70; 173/198, 50, 51, 52, 101; 29/81.15, 81.16

(56) References Cited

U.S. PATENT DOCUMENTS

| | | | | | |
|---|---|---|---|---|---|
| 1,585,740 A | * | 5/1926 | Saulia | ........................ | 173/52 |
| 3,023,485 A | * | 3/1962 | Barthod | ..................... | 29/81.14 |
| 3,099,187 A | * | 7/1963 | Hoza | ........................... | 173/52 |
| 3,366,420 A | * | 1/1968 | Young | ....................... | 299/37.4 |
| 4,436,694 A | * | 3/1984 | Vassalotti et al. | ........... | 376/310 |
| 4,568,814 A | * | 2/1986 | Hamasaki et al. | ..... | 219/121.68 |
| 4,594,759 A | * | 6/1986 | Ikeda | ............................. | 125/6 |
| 4,940,289 A | * | 7/1990 | Trovato et al. | ............ | 299/37.4 |
| 5,267,382 A | * | 12/1993 | Aulson et al. | ............. | 29/81.14 |

* cited by examiner

Primary Examiner—John Kreck
(74) Attorney, Agent, or Firm—Weingarten, Schurgin, Gagnebin & Lebovici LLP

(57) ABSTRACT

It is suggested to machine contaminated surfaces, in particular radioactively contaminated concrete surfaces and masonry with pneumatically actuated striking tools. It has been shown that this is an extremely low-dust machining method with which the essentially the particles are struck off in the size order of 0.2 to 2.0 mm.

The method may be realized with a device (1) with which in a housing (2) several chambers are arranged over one another. Most preferred at the top a pressurized air feed chamber (10) is fed via a pressurized air connection (3). Therebelow there is located a pressurized air suction chamber (12) which comprises a suction connection (4). At the bottom there is arranged a collecting chamber in which chisel-like hammer bolts (51) are effective. The hammer bolts which are part of the striking tools (5) project out of the housing (2). The striking tools (5) pass through the pressurized air feed chamber (10), the suction chamber lying thereunder as well as an expansion chamber arranged under the suction chamber (12). The expanded air (11) reaches the surroundings and is in turn suctioned via the collecting chamber (13) which is limited to the surroundings by way of an air-permeable seal in the form of a brush seal (9). The device (1) is held by a clip (6) on which there is provided a mounting (7) which serves for connecting to a robot arm.

10 Claims, 3 Drawing Sheets

DEVICE FOR THE REMOVAL OF THE SURFACE LAYER OF A WALL OR CEILING

BACKGROUND OF THE INVENTION

The present invention relates to a method for mechanical decontamiation of contaminated surfaces of mineral materials, in particular concrete surfaces and masonry. Although the application of the method or the use of the device according to the invention is mainly concerned with radioactively contaminated surfaces, the method as well as the device is indeed suitable for decontaminating contaminated surfaces of mineral materials by removal of a contaminated layer. In particular here one envisages masonry and ground surfaces in and around the reactor building, however one also considers walls or ground which is PCB contaminated, or simply also concrete surfaces and masonry smeared with paint.

There are known methods and devices for cleaning radioactive surfaces of materials based on cement or concrete and of masonry with which one mechanically removes the contaminated locations in that one manually grinds away the surface by machine. For this in particular the publication "Strahlschutzaspekte bei radioaktiven Kontamination" (Radiation protection aspects with radioactive contamination) by A. Etzweiler et al. is referred to, which appeared on the occasion of the 17th annual meeting of the "Fachverband für Strahlenschutz" e.V. from 8 Jun. 1983–10 Jun. 1983 in Aachen. The completely dry, purely mechanical cleaning methods described here all effect a great creation of dust, and at the same time the shown expense with regard to apparatus is large. The quantity of dust occuring with these methods leads to a large problem of contamination, wherein the already cleaned walls are practically recontaminated, if only to a lesser extent. Accordingly the surfaces must be machined several times and there arises a great amount of material to be disposed of. In particular with radioactively contaminated surfaces one seeks methods by way of which the quantity of waste is reduced as much as possible since this waste must be disposed of according to national regulations. The disposal of radioactive material is accordingly extremely expensive.

As is known the radioactive contamination is limited essentially to the surface or to the region close to the surface. Based on this recognition one has selected methods which typically are for a low removal depth, specifically in particular grinding or machining methods. As previously mentioned, these two methods however have the disdvantage that they set free large quantities of dust. The dust occuring at the same time is extremely fine and accordingly is difficult to filter. Accordingly also large efforts must be made in order to be able to safely vacuum and filter out this fine dust, which again considerably increases to secondary waste which this entails. This matter becomes a particular problem when the suctioned air must additionally be washed.

BRIEF SUMMARY OF THE INVENTION

As a result it is the object of the present invention to provide a method for the mechanical decontamination of contaminated surfaces of mineral materials, with the aim of reducing the occuring quantity of waste and reducing the demanded working time.

This object is achieved by method with the features of patent claim 1.

In place of grinding or milling tools here there are used striking tools. This produces considerably larger particles on removal which may be easily suctioned and at the same time may also be filtered from the suctioned air considerably more simply. In particular with the advantageous use of chisel-like hammer bolts material may be removed which have a majority of particles in the size order of 0.2 to 2 millimeters.

At the same time completely unusual is the use of pneumatically actuated striking tools. Indeed the use of as possible since this waste must be disposed of according to national regulations. The disposal of radioactive material is accordingly extremely expensive.

As is known the radioactive contamination is limited essentially to the surface or to the region close to the surface. Based on this recognition one has selected methods which typically are for a low removal depth, specifically in particular grinding or machining methods. As previously mentioned, these two methods however have the disdvantage that they set free large quantities of dust. The dust occuring at the same time is extremely fine and accordingly is difficult to filter. Accordingly also large efforts must be made in order to be able to safely vacuum and filter out this fine dust, which again considerably increases to secondary waste which this entails. This matter becomes a particular problem when the suctioned air must additionally be washed.

BRIEF SUMMARY OF THE INVENTION

As a result it is the object of the present invention to provide a method for the mechanical decontamination of contaminated surfaces of mineral materials, with the aim of reducing the occuring quantity of waste and reducing the demanded working time.

This object is achieved by method with the features of patent claim 1.

In place of grinding or milling tools here there are used striking tools. This produces considerably larger particles on removal which may be easily suctioned and at the same time may also be filtered from the suctioned air considerably more simply. In particular with the advantageous use of chisel-like hammer bolts material may be removed which have a majority of particles in the size order of 0.2 to 2 millimeters.

At the same time completely unusual is the use of pneumatically actuated striking tools. Indeed the use of pneumatically actuated apparatus was frowned upon since by way of this a swirling of the dust is practically assisted further. It was however not known that thanks to the use of pneumatically actuated striking tools the particle size of the removed materials is considerably larger and the dust formation accordingly already from the beginning is reduced to a minimum. The problem is additionally alleviated in that according to the invention the space in which the striking tools operate is sealed from the surrounding air and the removed particles are suctioned out of this space, wherein the volume of the air which is suctioned off is larger than the volume of the air which is used for the actuation. With this there arises in the surroundings practically a vacuum. In order at the same time to also avoid smaller airflows with a high speed, the actuation air for the striking tools before delivery to the surroundings is most preferably led into an expansion space. From the expansion space then the actuation air flows uniformly and with a relatively low flow speed.

It is a further object of the present invention to provide a device for the mechanical decontamination of contaminated surfaces of mineral material, in particular of radioactively contaminated surfaces which may achieve the desired advantageous manner of operating.

Such a device is specified in claim 4. Further advantageous embodiment forms of the device according to the invention are to be deduced from the claims 5 to 18 and their significance is explained in the subsequent description with reference to the accompanying drawings.

BRIEF DESCRIPTION OF THE DRAWINGS

In the drawing shown simplified is one embodiment form of the device according to the invention and this is subsequently described in detail. There are shown in FIG. 1 a perspective representation of the device according to the invention in its entirety and FIG. 2 a middle vertical section through the device according to FIG. 1 as well as FIG. 3 an axial section through the striking tool, how several are accommodated in the device according to the FIGS. 1 and 2.

DETAILED DESCRIPTION OF THE INVENTION

Figure 1:
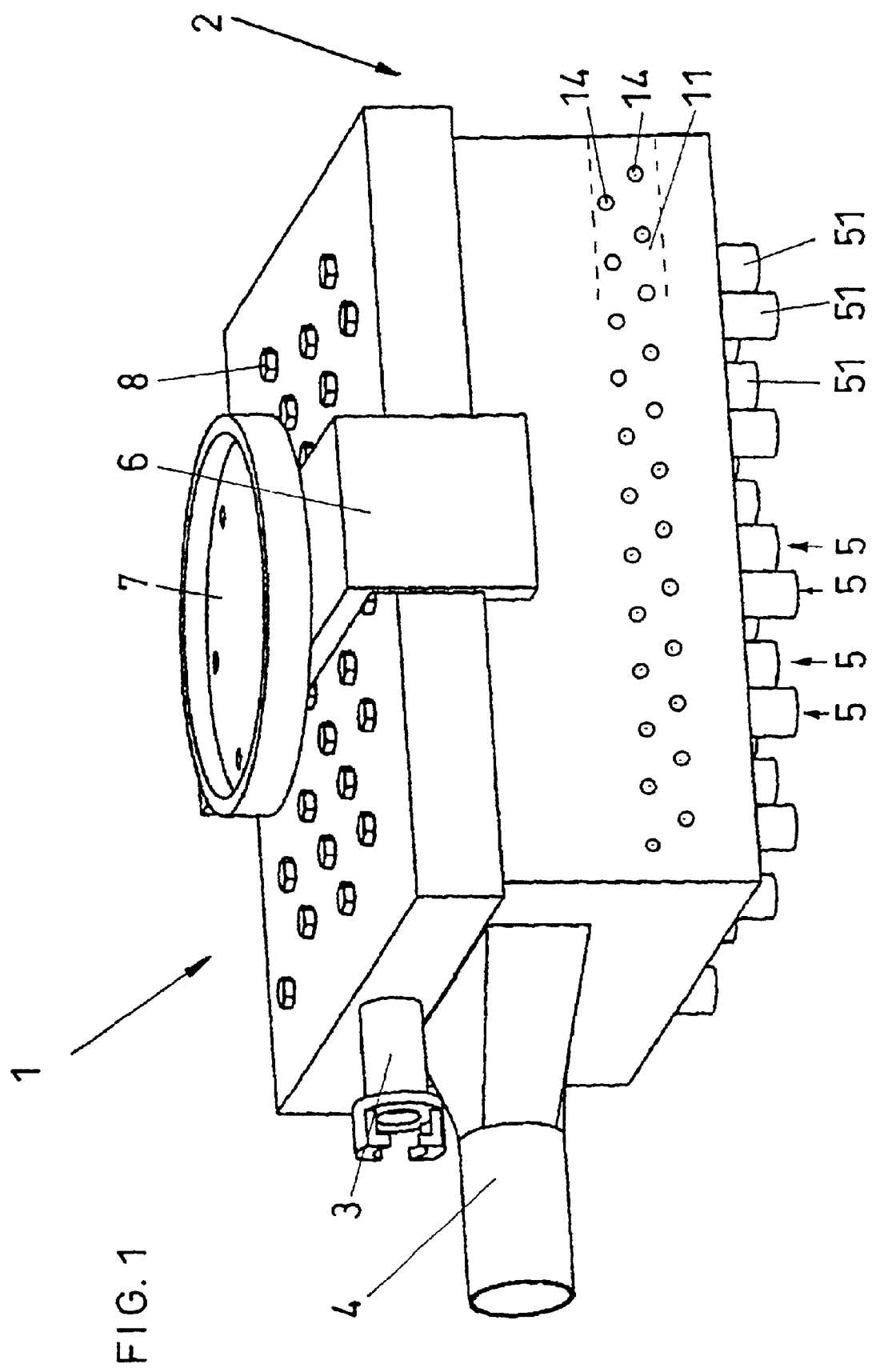

Firstly the device according to the invention is described with regard to its bodily features and hereinafter also the manner of functioning is dealt with and the method according to the invention is once again briefly explained. The device is indicated in its entirety with the reference numeral 1. The device 1 comprises a housing 2 with a pressurized air connection 3 arranged in the upper region and a suctioning connection 4 arranged thereunder on the same side. The housing has essentially here a cuboidly selected shape and the first widened region of the housing 2 is held by a clip or bow 6 in an overlapping manner. On the clip 6 there is fixed a mounting which is suitable for connection to a mechanical actuation, in particular this mounting is used in order to permit a possible connection to a robot arm. Projecting below out of the housing 2 one recognises a multitude of schematically indicated chisel-like hammer bolts which form the active part of the striking tools arranged in the housing. Whilst one recognises the chisel-like hammer bolts 51 in FIG. 1 the actual striking tools 5 are not visible. Only their fastening by way of the screw connections 8 is recognisable. Furthermore on the housing 2 there is visible only from the outside that region in which the pressurized air expansion chamber 11 is arranged. In this region there are recognisable suitable bleed openings 14.

Figure 2:
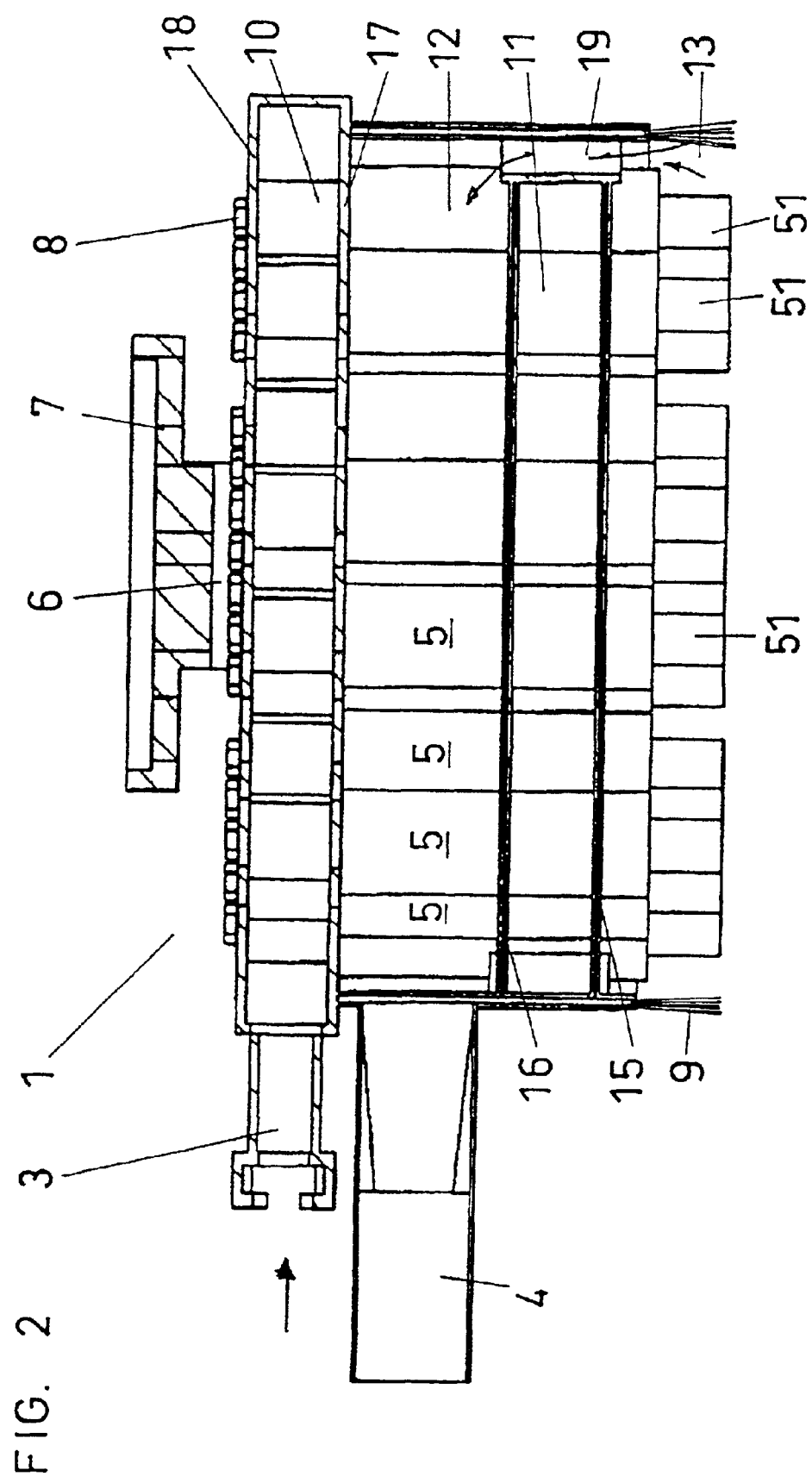

In FIG. 2 there is shown a schematic vertical section through the device according to the invention. In this representation the individual chambers arranged over one another in the housing 2 are recognisable. In the embodiment variant shown here the pressurized air supply chamber 10 is shown at the top. Arranged directly therebelow is the suction chamber 12 which is communicatingly connected to the suction connection 4. Following it in the declining direction there is recognisable the pressurized air expansion chamber 11. Always at the bottom there is arranged the collecting chamber 13. The collecting chamber 13 is delimited with respect to the surroundings by way of an air-permeable seal 9. In the shown example as an air-permeable seal one has selected a so-called brush seal. Towards the bottom the collecting chamber 13 in the operating position is closed off by the surface to be machined, whilst to the top the collecting chamber 13 is delimited by an intermediate base 15. This first intermediate base 15 forms the lower limitation surface of the pressurized air expansion chamber 11 which is delimited to the top by a second intermediate base 16. This second intermediate base 16 simultaneously forms the lower limitation of the suction chamber 12. Similar to a lid the suction chamber is 12 likewise covered over by a lower limitation surface 17 of the pressurized air supply chamber 10. Towards the surroundings finally the pressurized air supply chamber 10 is sealed by an upper limiting surface 18. The actual striking tools 5 are accommodated in a relatively compact arrangement in the housing 2. Each striking tool passes through the chambers 11 to 13 arranged over one another. The leading of the striking tools 5 through the individual chambers 10 to 13 is effected of course in a sealing form. With this it is ensured than there does not exist any communicating direct connection between in each case two chambers neighbouring one another.

Figure 3:
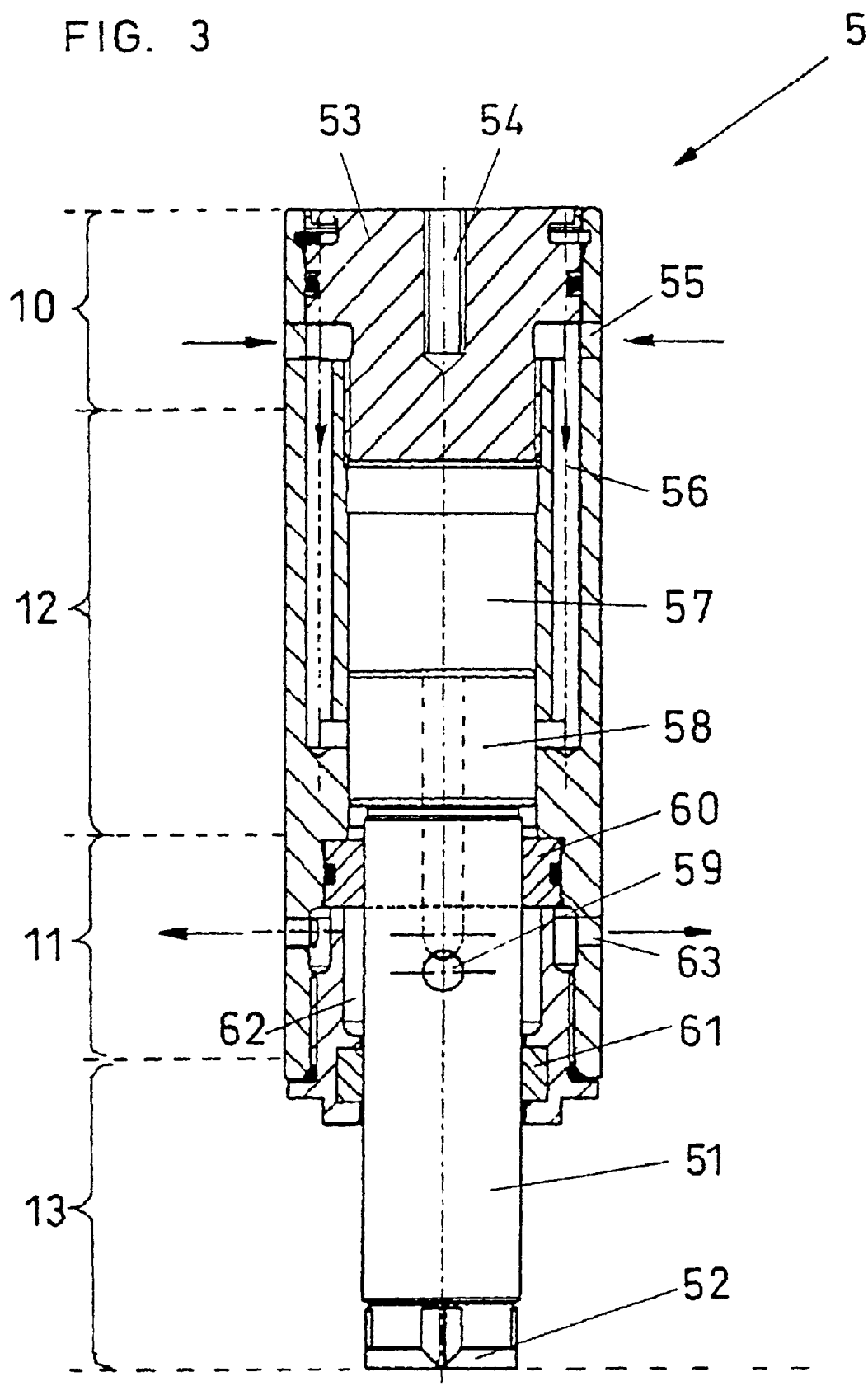

In FIG. 3 there is shown a vertical section through a striking tool 5. Here it is the case of a commercially available striking tool. Essentially the striking tool 5 consists of a cylindrical housing sleeve 50 and a chisel-like hammer bolt 51 guided therein. The chisel-like hammer bolt 51 below comprises suitably formed machining surfaces 52. At the upper end the housing sleeve 50 is secured by a tool head 53 and is sealingly closed. In the tool head 53 there is admitted a pocket hole 54 with an inner thread for the screwable fastening by way of screw connections 8. In the cylindrical housing sleeve 50 there are formed air feeds 55 and air conduits 56. The air conduits 56 open out into a cylinder space 56 in which a piston is moved to and fro. The piston 58 is connected as one piece to the chisel-like hammer bolt 51. The diameter of the hammer bolt 51 is smaller than the diameter of the piston 58. The hammer bolt 51 is mounted in an upper and a lower axial face seal 60 and 61. A communicating bore 59 represents a connection through the piston 58 between the cylinder space 57 and the bleed space 62 which is present therebelow and is delimited by the axial face seal 60. The air may escape from the bleed space 62 through the exit bores 63.

The pressurized air coming from a pressure conduit not shown here via the pressurized air connection 3 into the pressurized air feed chamber 10 thus flows through the air feeds 55 into the striking tool 5. Through the striking tool 5 the pressurized air in a pulsating manner via the exit bores 63 reaches in the pressurized air expansion chamber 11. The pressurized air expansion chamber 11 is large in relation to the relatively low air quantities, which are expelled per cylinder stroke. The suitably expanded and settled air thus flows uniformly out of the bleed openings 14 and as a results hardly effects any swirling in the surrounding air.

Via the suctioning connection 4 to which there is applied a vacuum, air is suctioned out of the suction chamber 12. The suction chamber 12 via return suction channels 19 is in direct communicating connection with the collecting chamber 13. It is advantageous and useful to arrange the return suction channels 19 peripherally along the outer wall of the housing 12, however in the inner space. The return suction channels 19 at the same time pass through the pressurized air expansion chamber 11. In order to achieve as advantageous as possible suction effect it is useful to keep the collecting chamber 13 relatively small with regard to volume. The peripheral arrangement of the return suction channels 19 is selected because the whole device 1 is moved over the surface to be machined. Thus as a result also the whole surface to be machined is brushed over by this annular-gap-like region. With the use of brush seals as air permeable seals 9 it is additionally ensured that further slightly adhering particles are released and immediately suctioned. At the same time it is to be taken into account that volumetrically, from the collecting chamber 13 more air is suctioned than air is fed via the pressurized air connection 3 for actuating the striking tools 5. With this it is ensured that also further air from the surroundings is suctioned through the air-permeable seal 9 into the collecting chamber 13, by which means small amounts of dust arising in the collecting chamber do not go to the surroundings but are directly led back.

First trials with the device according to the invention have shown that one may operate practically without recontamination dust development. The largest portion of the released particles lies in the size order of 0.2 to 2.0 mm. Individual smaller or larger particles arise. The filtering-out of particles of this size order does not technically represent any problem. With comparative measurements, which were carried out on the occasion of first rials, it was ascertained that the machining time could be reduced to practically half with a simultaneous reduction in waste to a few percent of the waste quantities which occured in the past. The savings of disposal costs are accordingly enormous.

LIST OF REFERENCE NUMERALS

| | |
|---|---|
| 1 | device |
| 2 | housing |
| 3 | pressurized air connection |
| 4 | suction connection |
| 5 | striking tools |
| 6 | clip |
| 7 | mounting |
| 8 | screw connection |
| 9 | air-permeable seal, brush seal |
| 10 | pressurized air feed chamber |
| 11 | pressurized air expansion chamber |
| 12 | suction chamber |
| 13 | collecting chamber |
| 14 | bleed openings |
| 15 | first intermediate space |
| 16 | second intermediate spave |
| 17 | lower limiting surface |
| 18 | upper limiting surface |
| 19 | return suction channels |
| 50 | housing sleeve |
| 51 | chisel-like hammer bolts |
| 52 | machining surfaces |
| 53 | tool head |
| 54 | pocket hole with inner thread |
| 55 | air feeds |
| 56 | air conduits |
| 57 | cylinder space |
| 58 | piston |
| 59 | communicating bore |
| 60 | end face seals |
| 61 | end face seals |
| 62 | bleed space |
| 63 | exit bores |

What is claimed is:

1. A device for the mechanical decontamination of contaminated surface of mineral materials, wherein said surface is radioactively contaminated concrete or radioactively contaminated masonry, wherein the device comprises several pneumatically actuated striking tools, wherein said striking tools are arranged in a housing with several chambers arranged over one another such that each of said striking tool is in active connection with each chamber, wherein said several chambers comprising a pressurized air feed chamber, a pressurized air expansion chamber, a suction chamber, a collecting chamber or any combination thereof, wherein said striking tools are releasably connected to the pressurized air chamber and sealingly pass through arranged chambers, wherein said collecting chamber is sealed with respect to the surroundings in an air-permeable manner, wherein said pressurized air expansion chamber is arranged between the suction chamber lying directly thereabove and the collecting chamber lying directly therebelow, and wherein said expansion chamber is passed through by several lead-throughs which form communicating connections between the collecting chamber and the suction chamber.

2. The device according to claim 1, wherein the pressurized air feed chamber in the device is arranged at the top and the collecting chamber is arranged at the bottom.

3. The device according to claim 2, wherein the pressurized air feed chamber projects beyond the chamber located therebelow and is held by an overlapping clip which serves as a mounting for a robot arm or handling apparatus connectable thereto.

4. The device according to claim 1, wherein the pressurized air expansion chamber lies between the pressurized air feed chamber lying directly thereabove and the common collecting and suction chamber lying directly therebelow.

5. The device according to claim 1, wherein the air-permeable sealing is effected by way of a circumferential skirt.

6. The device according to claim 1, wherein the air-permeable sealing is effected by way of a circumferential brush seal.

7. The device according to claim 1, wherein the releasable striking tools are held by way of screw connections passing through the housing on the outside.

8. The device according to claim 1, wherein the striking tools are equipped with exchangeable, chisel-like hammer bolts.

9. The device according to claim 1, wherein the pressurized air feed chamber in the device is arranged at the top and the collecting chamber at the bottom.

10. A device for the mechanical decontamination of contaminated surface of mineral materials, wherein said surface is radioactively contaminated concrete or radioactively contaminated masonry, wherein the device comprises several pneumatically actuated striking tools, wherein said striking tools are arranged in a housing with several chambers arranged over one another such that each of said striking tool is in active connection with each chamber, wherein said several chambers include a pressurized air feed chamber, a pressurized air expansion chamber, a suction chamber, a collecting chamber or any combination thereof, wherein said striking tools are releasably connected to the pressurized air chamber and sealingly pass through arranged chambers, wherein said collecting chamber is sealed with respect to the surroundings in an air-permeable manner, wherein said pressurized air expansion chamber is arranged between the suction chamber lying directly thereabove and the collecting chamber lying directly therebelow, wherein said expansion chamber is passed through by several lead-throughs which form communicating connections between the collecting chamber and the suction chamber, and wherein the lead-throughs peripherally pass through the expansion chamber.

* * * * *